(12) United States Patent
McAllister

(10) Patent No.: US 11,627,770 B2
(45) Date of Patent: Apr. 18, 2023

(54) HAND WORN DEBRIS REMOVAL DEVICE

(71) Applicant: Alan McAllister, Hyde Park, VT (US)

(72) Inventor: Alan McAllister, Hyde Park, VT (US)

(73) Assignee: Alan McAllister, Hyde Park, VT (US)

( * ) Notice: Subject to any disclaimer, the term of this patent is extended or adjusted under 35 U.S.C. 154(b) by 525 days.

(21) Appl. No.: 16/705,577

(22) Filed: Dec. 6, 2019

(65) Prior Publication Data
US 2020/0107597 A1    Apr. 9, 2020

Related U.S. Application Data

(63) Continuation-in-part of application No. 16/026,415, filed on Jul. 3, 2018, now abandoned.

(60) Provisional application No. 62/528,552, filed on Jul. 5, 2017.

(51) Int. Cl.
*A41D 19/015* (2006.01)
*A01B 1/20* (2006.01)
*A41D 19/00* (2006.01)

(52) U.S. Cl.
CPC .......... *A41D 19/01594* (2013.01); *A01B 1/20* (2013.01); *A41D 19/0082* (2013.01)

(58) Field of Classification Search
CPC .......... A41D 19/01594; A41D 19/0082; A01B 1/20
USPC .............. 2/160, 163, 161.6; 15/227; 294/25
See application file for complete search history.

(56) References Cited

U.S. PATENT DOCUMENTS

| | | | | |
|---|---|---|---|---|
| 1,055,838 A * | 3/1913 | Torrance | .......... | A41D 19/01547 2/21 |
| 1,902,453 A * | 3/1933 | Kaiser | .......... | A01K 97/18 172/370 |
| 2,409,101 A * | 10/1946 | Brittingham | .......... | A01B 1/00 2/21 |
| 2,954,832 A * | 10/1960 | Pirone | .......... | A01G 20/30 172/370 |
| 4,149,601 A * | 4/1979 | Taylor | .......... | A41D 19/01594 30/298 |
| 4,867,246 A * | 9/1989 | Kiger | .......... | A41D 19/01594 172/370 |
| 5,522,821 A * | 6/1996 | Brown | .......... | A61B 17/062 2/163 |
| 5,644,796 A * | 7/1997 | Laughlin | .......... | A41D 19/01594 2/163 |

(Continued)

FOREIGN PATENT DOCUMENTS

| | | | |
|---|---|---|---|
| JP | 2000239910 A | * | 9/2000 |
| JP | 2006291405 A | * | 10/2006 |
| JP | 2012244984 A | * | 12/2012 |

OTHER PUBLICATIONS

Translation of JP-2000239910-A (Year: 2022).*

*Primary Examiner* — Khaled Annis
*Assistant Examiner* — Dakota Marin
(74) *Attorney, Agent, or Firm* — Caldwell Intellectual Property Law

(57) ABSTRACT

Attachments for gloves or fingers is provided that allows for easier removal of grass clippings from the underside of a lawnmower deck. The attachments assist wearers and protecting the hands of wearers when cleaning and digging. The attachments may be installed on a dove with fingerstalls via a sleeve that fits over the fingerstalls and a tip that extends distally from the sleeve. Each tip may include a scraper attached such that the wearer can exert leverage on the scrapers to assist with cleaning or digging.

17 Claims, 7 Drawing Sheets

(56) References Cited

U.S. PATENT DOCUMENTS

| | | | | |
|---|---|---|---|---|
| 5,706,520 | A * | 1/1998 | Thornton | A41D 19/01517 2/21 |
| 6,918,137 | B2 * | 7/2005 | Fowler | A41D 13/087 2/21 |
| 7,574,748 | B2 * | 8/2009 | Fisher | A41D 19/01588 2/160 |
| 8,381,313 | B2 * | 2/2013 | Logan | A41D 13/087 2/21 |
| 8,844,080 | B2 * | 9/2014 | Stacy | A47J 43/28 7/113 |
| 8,955,166 | B1 * | 2/2015 | Madden, Jr. | A41D 19/01547 2/160 |
| 9,345,278 | B2 * | 5/2016 | Crear | B26B 27/007 |
| 11,033,061 | B2 * | 6/2021 | Braithwaite | A41D 19/01594 |
| 11,096,435 | B2 * | 8/2021 | Kamphuis | A41D 19/01505 |
| 2007/0118968 | A1 * | 5/2007 | Doty | A61H 7/003 2/160 |
| 2007/0266475 | A1 * | 11/2007 | Frazier | A41D 19/015 2/161.1 |
| 2013/0291281 | A1 * | 11/2013 | Lee | A41D 19/0024 2/163 |
| 2016/0007663 | A1 * | 1/2016 | Price | A41D 19/0024 2/160 |
| 2016/0081404 | A1 * | 3/2016 | Visokey | A41D 13/087 2/21 |
| 2016/0309815 | A1 * | 10/2016 | Hull | A41D 19/0058 |
| 2021/0161225 | A1 * | 6/2021 | Braithwaite | A47L 25/00 |

* cited by examiner

HAND WORN DEBRIS REMOVAL DEVICE

RELATED APPLICATION DATA

This application is a continuation-in-part of U.S. patent application Ser. No. 16/026,415, filed Jul. 3, 2018 and titled "Hand Worn Debris Removal Device," which claims priority to the benefit of Provisional Applications for Patent Ser. No. 62/528,552, filed Jul. 5, 2017 and titled "Hand Worn Debris Removal Device," each of which is incorporated herein in its entirety.

FIELD OF THE INVENTION

The present invention generally relates to hand worn tools. In particular, the present invention is directed to a Hand Worn Debris Removal Device.

BACKGROUND

Certain tasks are more easily and more efficiently accomplished by use of hands and fingers rather than by use of a tool that must be grasped within the hand, such as certain gardening, weeding, and cleaning tasks. Often, however, such tasks will get one's hands dirty and/or cause damage to one's hands and fingernails. To that end, prior art gloves have been made with projections attached to the fingertips, for example, as taught in U.S. Pat. No. 4,867,246 to Kiger.

There is a need, however, for attachments for fingers or fingerstalls designed for removing grass clippings from the underside of a lawnmower deck or similar tasks.

SUMMARY OF THE DISCLOSURE

A device for removing debris, such as grass clippings from the underside of a deck of a lawnmower, is provided. The device is configured to be worn on the end of a user's finger or the fingerstalls of a glove and includes a sleeve member having a distal end and a proximal end, wherein the sleeve member is tubular and is sized and configured to receive a finger of a user. A tip member extends from the distal end of the sleeve member, wherein the tip member is open on a palm side when worn on the user's finger such that a portion of the user's finger extends through the distal end of the sleeve member.

A hand worn debris removal device is also provided that includes a glove with a back side, a palm side, a proximal side and a distal side, in which the glove has a plurality of fingerstalls. A plurality of scraping devices is attached to each of the respective plurality of fingerstalls at the distal side. Each of the plurality of scraping devices includes a sleeve member having a distal, end and a proximal end, wherein the sleeve member is tubular and is sized and configured to receive a finger of a user, and a tip member extending from the distal end of the sleeve member, wherein the tip member is open on the palm side such that a portion of a user's finger extends through the distal end of the sleeve member.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

The hand worn scraping and digging attachments of the present invention assist a user in removing debris, such as grass clippings from the underside of a lawnmower deck, digging, such as in soil, gravel, or packed snow, weeding, and cleaning various surfaces. The ergonomic device attachments can be attached to a glove with fingerstalls or a mitten. These rigid, claw-like attachments to the fingerstalls of a glove or mitten provide the wearer with protection of fingers and fingernails as well as increased leverage and increased effectiveness due to the greater hardness and durability of the attachments. The increased leverage is further achieved because a wearer's fingers extend through a portion of the attachment on the palm side, allowing the wearer's finger to exert a force in the proximal direction on the attachments.

Figure 1A:
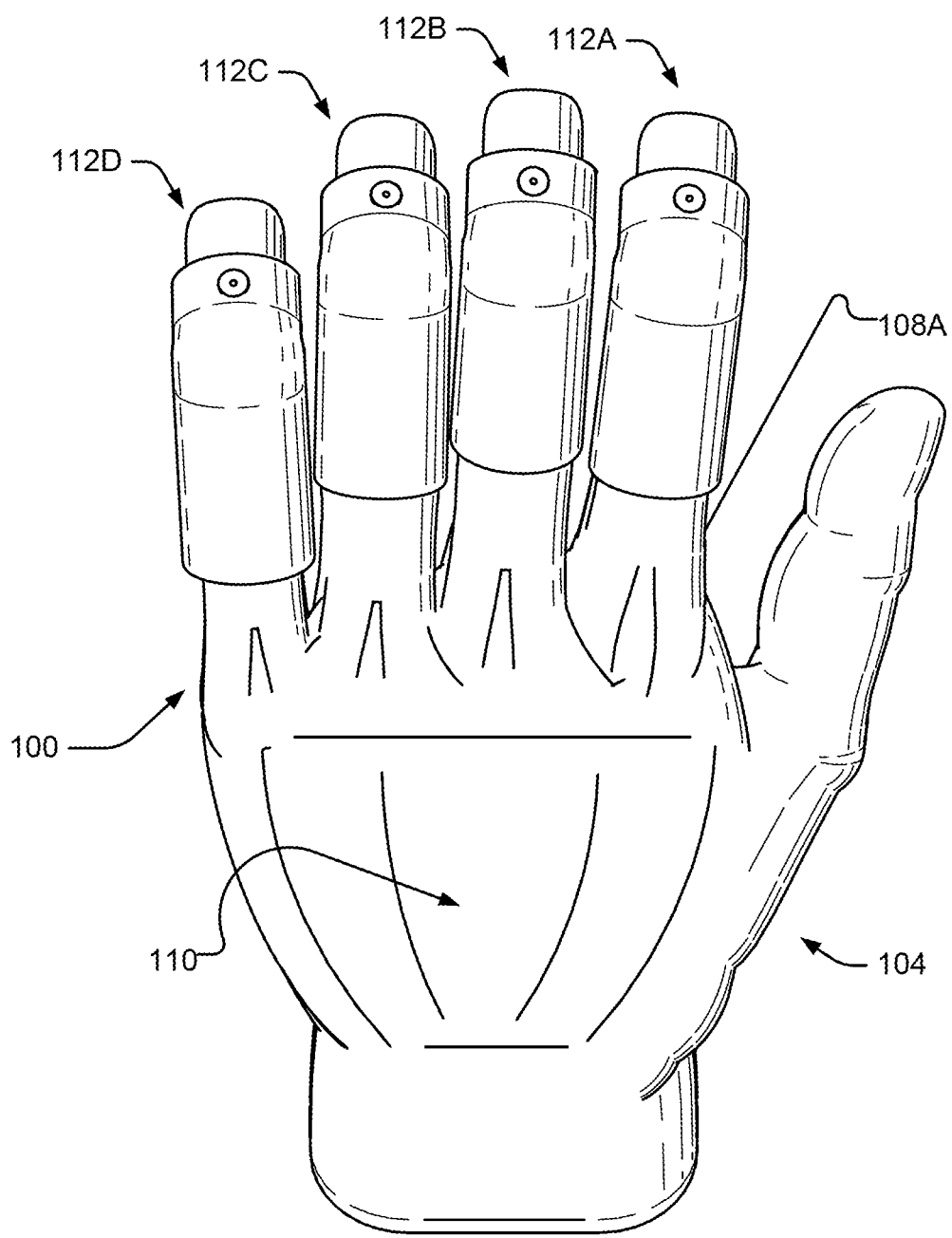
FIG. 1A is a top perspective view of a hand worn scraping device in accordance with an embodiment of the present invention.
Figure 1B:
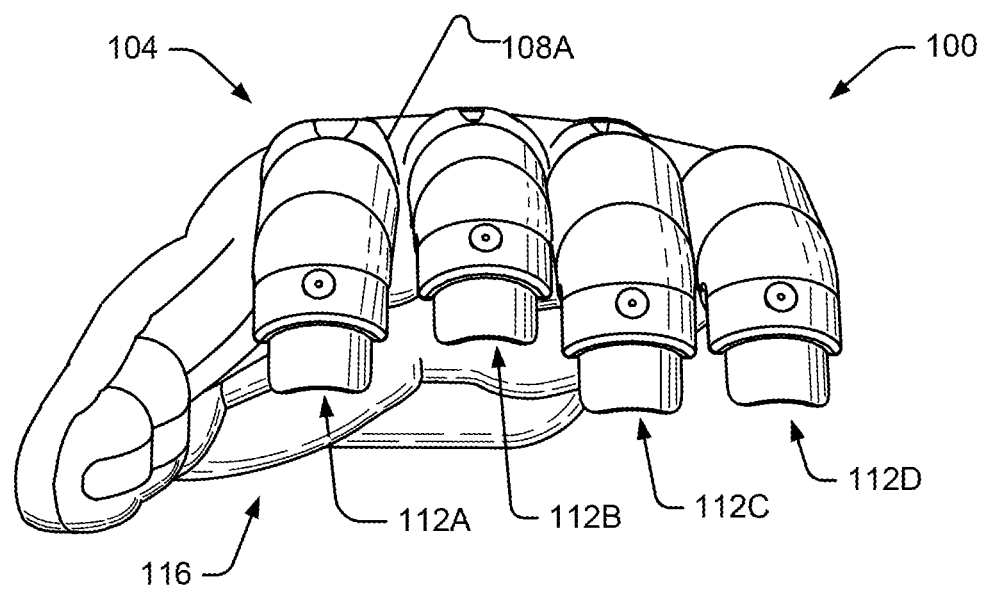
FIG. 1B is a front perspective view of the hand worn scraping device of FIG. 1A.

An exemplary hand worn scraping device 100 is shown in FIGS. 1A-1B and includes a glove 104 with a main body having a back side 110, a palm side 116, and a plurality of fingerstalls 108 (e.g., 108A). Attached to and extending from the ends of each fingerstall 108 are attachments 112 (e.g., 112A-112D). Attachments 112 may be attached to each respective fingerstall 108 using any suitable technique, including for example an adhesive.

Turning to FIGS. 2A-2D, an exemplary attachment 112 is shown. Attachment 112 includes a sleeve 120 and a tip portion 124. Sleeve 132 may be made of any suitable material, such as rigid plastic and is configured to be attached to fingerstall 108 and receive a finger of a wearer. Sleeve 120 may be any suitable shape but is preferably tubular or cylindrical. Tip portion 124 is attached to a distal end of sleeve 120 and includes an open area 132 on the palm side. Opening 132 is sized and located such that when worn by a user, the user's finger is exposed through opening 132 and thus is able to exert a force in a proximal direction against attachment 112. Tip portion 124 may be made of any suitable material, such as rigid plastic and may form a uniform body with sleeve 120. Tip portion may be angled toward the palm side as shown in the embodiment of FIGS.

2A-2D. The angle may be about 48 degrees, although this angle may vary. In one embodiment, it will fall between about 25 to about 60 degrees, and preferably from about 35 to 55 degrees.

Tip portion may include a scraper member 128 that is attached to tip portion 124 and extends distally therefrom. Scraper member may be made from any suitable material, including rigid plastic or metal, and in a preferred embodiment is attached to the palm side of tip 124. Scraper member 128 may be flat or curved. As shown in FIGS. 2C-2D, the attachment of scraper member 128 to tip 124 may be via a rivet 136 or similar securing scraper member 128 to tip 124 via holes 140, 144.

In a preferred embodiment, when attached to a fingerstall 108, sleeve 120 extends inwardly to at or near a location on fingerstall 108 where a wearer's second knuckle would be when glove 104 is worn in a typical manner, which helps provide leverage for scraping or digging motions and reduces the chance that attachment 112 will slide out from a user's grasp when in use. This placement, along with the configuration of sleeve 120 and tip 124, allows for scraper member 128 to be leveraged by a user in that the shape and configuration of attachment 112 allows a user to transfer force to scraper member 128 from the user's arm, and not just the user's fingers, through sleeve 120 and tip 124.

In a preferred embodiment, scraper member 128 is made of steel.

Figure 2A:
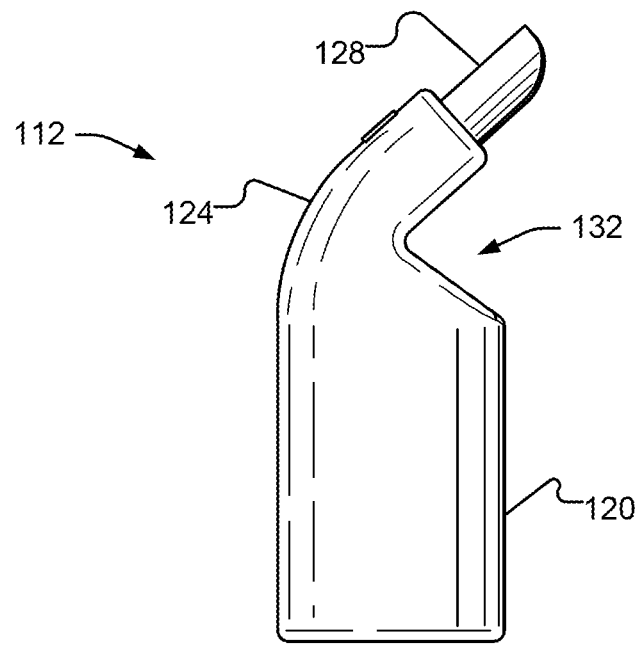
FIG. 2A is a side view of a scraping attachment for a hand worn scraping device in accordance with an embodiment of the present invention.
Figure 2B:
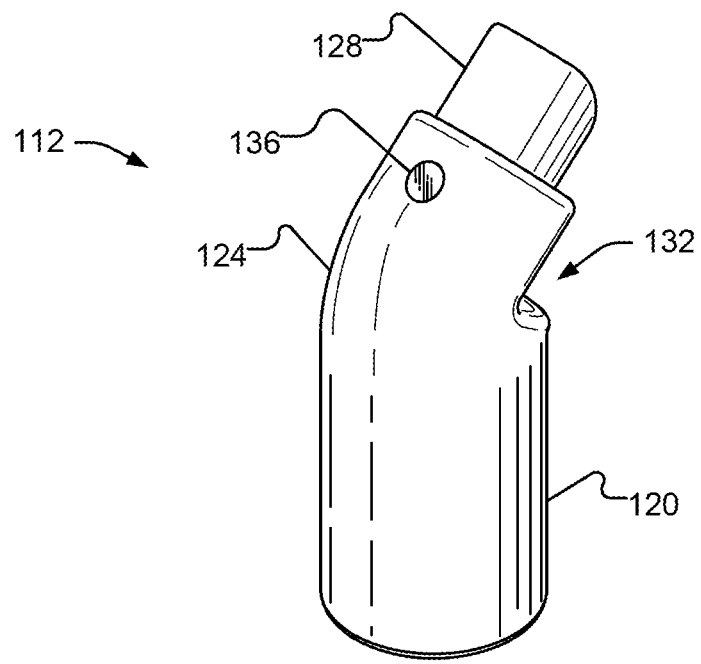
FIG. 2B is a perspective view of the scraping attachment of FIG. 2A.
Figure 2C:
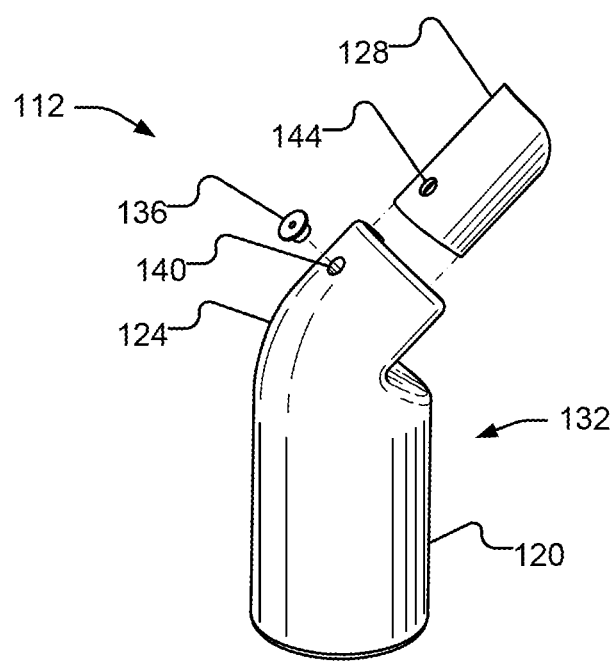
FIG. 2C is a partially exploded view of the scraping attachment of FIG. 2A.
Figure 2D:
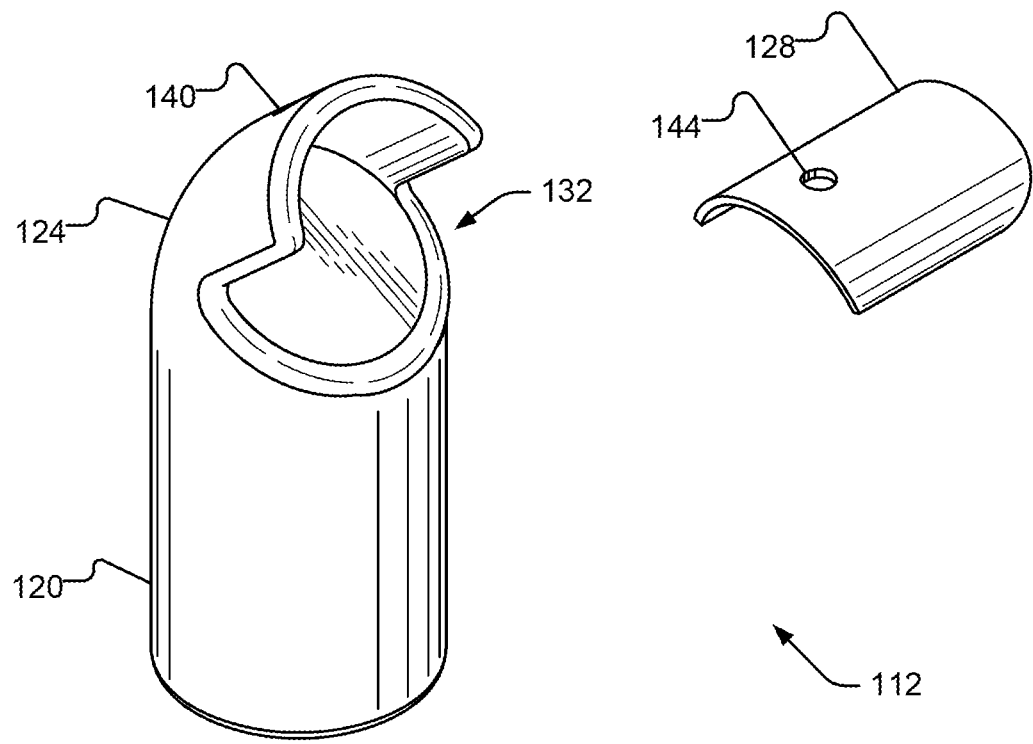
FIG. 2D is another partially exploded view of the scraping attachment of FIG. 2A.

As shown in FIGS. 2A-2B, attachment 112 is shown detached from, glove 104. As can be seen, attachment 122 is sized and configured to accommodate a fingerstall of a glove (and more particularly, the fingerstall of the glove with a finger of a wearer in it) and thus sleeve 120 may have a generally cylindrical shape that is open along the central axis. Tip portion 124 may have a generally similar shape as sleeve 120, although tip portion 124 may have a slightly smaller radius since tip portion 124 is sized and configured to accommodate the tip of a user's finger. In addition, tip portion 124 may be open for some or all of the palm facing side such that tip portion 124 may form about a half cylinder, for example, whereas sleeve 120 may have a full cylindrical shape. In an alternative embodiment, sleeve 120 may include a plurality of apertures along its length so long as it is structurally continuous such that forces conveyed on the palm facing side, e.g., by a wearer's finger protruding through the open portion of tip portion 120, are translated to the back facing side and thus tip portion 124 and scraper 128.

Figure 3A:
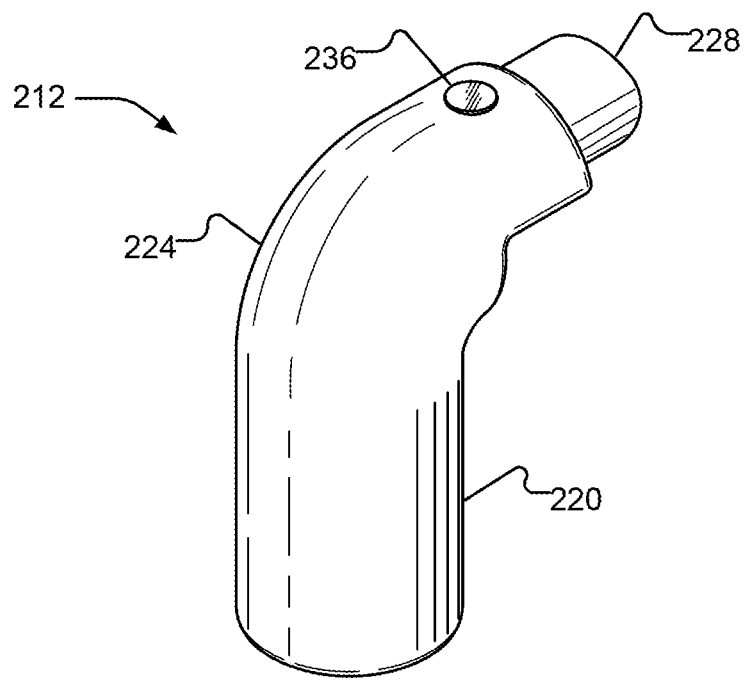
FIG. 3A is a perspective view of a scraping attachment for a hand worn scraping device in accordance with another embodiment of the present invention.
Figure 3B:
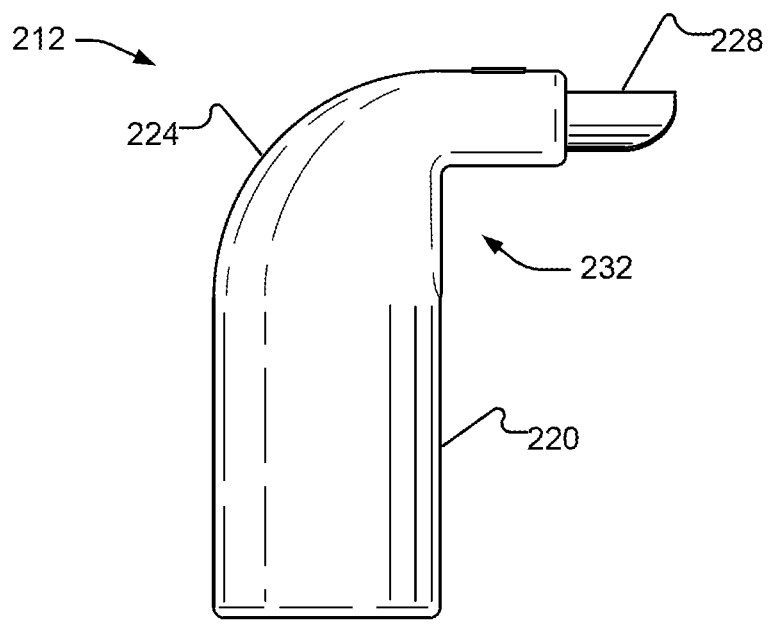
FIG. 3B is a side view of the scraping attachment of FIG. 3A.

In an alternative embodiment, as shown in FIGS. 3A-3B, an attachment 212 may include an angle of about 90 degrees to form an "L" shape between sleeve 220 and the distal portion of tip 224. Tip 224 includes an opening 232 on the palm side to enable a wearer's finger to grasp attachment 212 and exert a force in the proximal direction. A scraper member 228 may be attached to tip 224 via, for example, rivet 236. In a preferred embodiment, scraper 228 is secured to tip portion 224 such that scraper 228 is attached to a back side (as opposed to palm side) of tip portion 224 and more particularly secured such that a back facing side of scraper 228 is secured against a palm facing inner face of the back side of tip portion 224 (as shown in FIGS. 3A-3B).

Figure 4A:
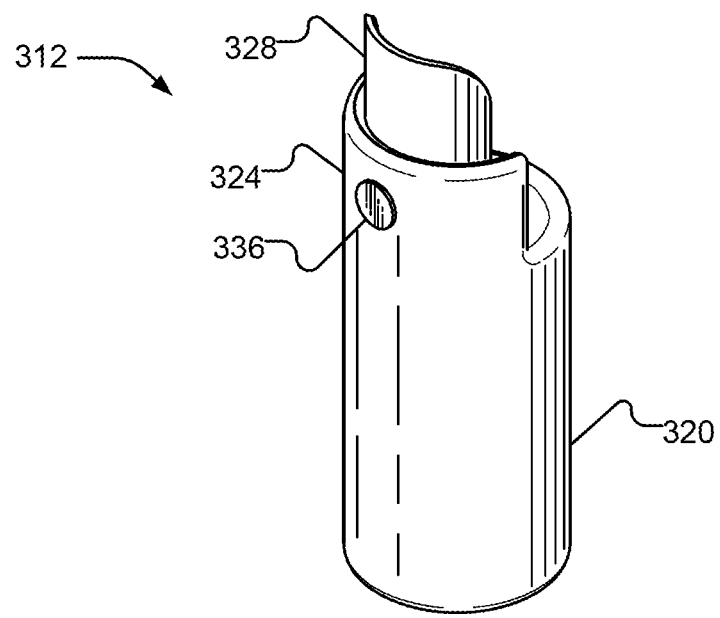
FIG. 4A is a perspective view of a scraping attachment for a hand worn scraping device in accordance with another embodiment of the present invention.
Figure 4B:
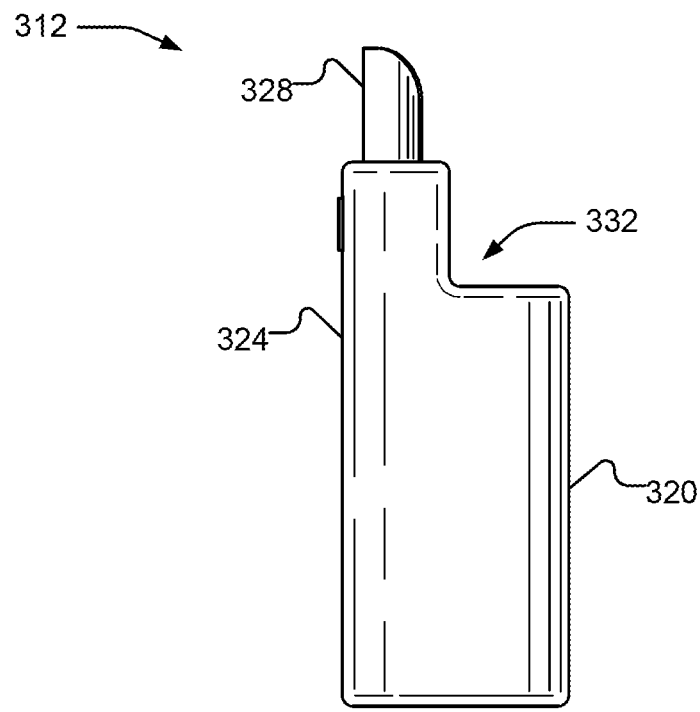
FIG. 4B is a side view of the scraping attachment of FIG. 4A.

In an alternative embodiment, as shown in FIGS. 4A-4B, an attachment 312 may include an angle of about 180 degrees between sleeve 320 and the distal portion of tip 324. Tip 324 includes an opening 332 on the palm side to enable a wearer's finger to grasp attachment 312 and exert a force in the proximal direction. A scraper member 328 may be attached to tip 324 via, for example, rivet 336. In a preferred embodiment, scraper 328 is secured to tip portion 324 such that scraper 328 is attached to a back side (as opposed to palm side) of tip portion 224 and more particularly secured such that a back facing side of scraper 228 is secured against a palm facing inner face of the back side of tip portion 224 (as shown in FIGS. 4A-4B).

Figure 5:
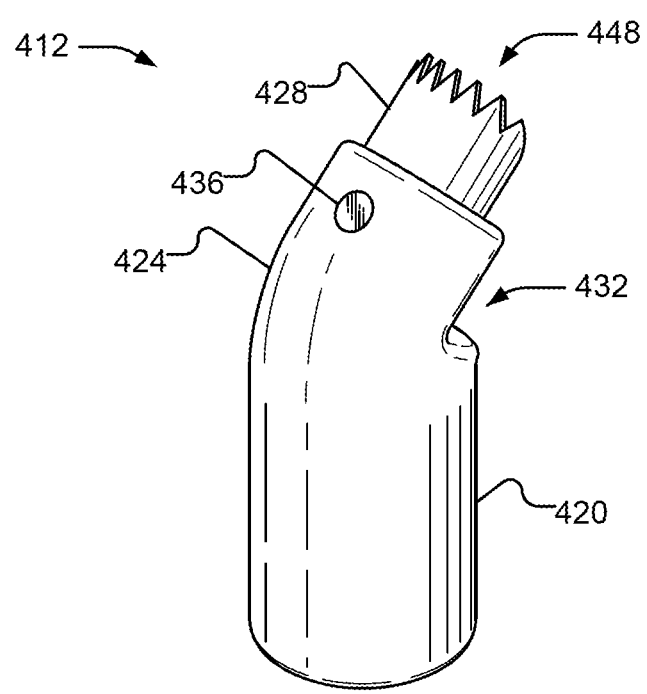
FIG. 5 a perspective view of a scraping attachment for a hand worn scraping device in accordance with another embodiment of the present invention.

In an alternative embodiment, as shown in FIG. 5, an attachment 412 includes a scraper member 428 attached to tip 424 via, for example, rivet 436. In a preferred embodiment, scraper 428 is secured to tip portion 424 such that scraper 428 is attached to a back side (as opposed to palm side) of tip portion 424 and more particularly secured such that a back facing side of scraper 428 is secured against a palm facing inner face of the back side of tip portion 424 (as shown in the FIG. 5). Scraper member 428 includes a serrated edge 448 in this embodiment, in which tip 424 includes an opening 432 on the palm side.

Other hand worn scraping devices consistent with the present invention include mittens with a single scraping attachment, mittens and gloves for both left and right hands, gloves with claws attached to the thumb stalls as well as the fingerstalls, and gloves with between one and three claws attached to between one and three respective fingerstalls. It will be understood that the sizes and relative locations of the features of the device of the present invention will be dependent on the size of the wearer and adjustment will be made based on sizes of the wearers.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An attachment for gloves for removing grass clippings from the underside of a lawnmower deck, wherein the attachment for gloves is worn on the end of a finger of a user, the attachment for gloves comprising:
   a tubular sleeve member having a distal end and a proximal end, wherein the sleeve member is sized and configured to receive a finger of a user; and
   a half-cylindrical tip member extending past the distal end of the sleeve member, the tip member comprising:
      a scraper member attached to the tip member by a rivet; and
      an opening on a palm side of the tip member and adjacent to the distal end of the sleeve member;
   wherein, when the attachment is placed on the finger of the user, the attachment is configured to have a portion of the finger extend through the distal end of the sleeve member such that the finger is not covered by the tip member on the palm side of the tip member.

2. The attachment of claim 1, wherein the scraper member extends distally from the tip member, wherein the scraper is composed of metal.

3. The attachment of claim 2, wherein the scraper member is attached to the tip member on the palm side of the tip member.

4. The attachment of claim 3, wherein the scraper member is serrated.

5. The attachment of claim 3, wherein the scraper member is curved.

6. The attachment of claim 1, wherein a 90-degree angle is formed between the sleeve member and the tip member.

7. The attachment of claim 1, wherein a 45-degree angle is formed between the sleeve member and the tip member.

8. The attachment of claim 1, wherein the sleeve member and the tip member form a uniform body.

9. A hand worn debris removal device comprising:
a glove with a back side, a palm side, a proximal side and a distal side, the glove having a plurality of fingerstalls;
a plurality of scraping segments, wherein each of the plurality of scraping segments is attached to a respective one of each of the plurality of fingerstalls at the proximal side of the scraping segment, and wherein each of the plurality of scraping segments includes:
a sleeve member having a distal end and a proximal end, wherein the sleeve member is tubular and is sized and configured to receive a finger of a user; and
a half-cylindrical tip member extending past the distal end of the sleeve member, the tip member comprising:
a scraper member attached to the tip member by a rivet; and
an opening on a palm side of the tip member and adjacent to the distal end of the sleeve member;
wherein, when the attachment is placed on the finger of the user, the attachment is configured to have a portion of the finger extend through the distal end of the sleeve member such that the finger is not covered by the tip member on the palm side of the tip member.

10. The hand worn debris removal device of claim 9, wherein the scraper member extends distally from the tip member, wherein the scraper is composed of metal.

11. The hand worn debris removal device of claim 10, wherein the scraper member is attached on an inside portion of the tip member.

12. The hand worn debris removal device of claim 11, wherein the scraper member is serrated.

13. The hand worn debris removal device of claim 11, wherein the scraper member is curved.

14. The hand worn debris removal device of claim 9, wherein a 90-degree angle is formed between the sleeve member and the tip member.

15. The hand worn debris removal device of claim 9, wherein a 45-degree angle is formed between the sleeve member and the tip member.

16. The hand worn debris removal device of claim 9, wherein the sleeve member and the tip member form a rigid, uniform body.

17. The hand worn debris removal device of claim 9, wherein the device is configured to have the user's finger extend through the sleeve member sufficiently such that the user's finger can engage with and exert a force in the proximal direction against the distal end of the sleeve member.

* * * * *

UNITED STATES PATENT AND TRADEMARK OFFICE
CERTIFICATE OF CORRECTION

PATENT NO. : 11,627,770 B2
APPLICATION NO. : 16/705577
DATED : April 18, 2023
INVENTOR(S) : Alan McAllister It is certified that error appears in the above-identified patent and that said Letters Patent is hereby corrected as shown below:

On the Title Page

Item (57) In the Abstract:

In Line 1, first sentence, cancel the text "is" following the word fingers and insert the word --are--.

In Line 1, first sentence, cancel the text "allows" before the word for and insert the word --allow--.

In Lines 3-4, second sentence, cancel the text "protecting" and insert the word --protect--.

In Line 5, third sentence, cancel the text "dove" and insert the word --glove--.

Signed and Sealed this
Thirteenth Day of June, 2023

Katherine Kelly Vidal
*Director of the United States Patent and Trademark Office*